US010995643B2

(12) United States Patent
Haverkamp et al.

(10) Patent No.: US 10,995,643 B2
(45) Date of Patent: May 4, 2021

(54) MIXING DEVICE

(71) Applicant: Tenneco GmbH, Edenkoben (DE)

(72) Inventors: Sascha Haverkamp, Jockgrim (DE);
Joachim Gehrlein, Rheinzabern (DE);
Stefan Kohrs, Neustadt/Weinstrasse
(DE); Eric A. Hein,
Neustadt-Diedesfeld (DE); **Attila
Kovacs**, Karlsruhe (DE)

(*) Notice: Subject to any disclaimer, the term of this patent is extended or adjusted under 35 U.S.C. 154(b) by 31 days.

(21) Appl. No.: 16/357,874

(22) Filed: Mar. 19, 2019

(65) Prior Publication Data
US 2019/0211732 A1 Jul. 11, 2019

Related U.S. Application Data

(63) Continuation of application No. 15/552,593, filed as application No. PCT/EP2016/055007 on Mar. 9, 2016.

(30) Foreign Application Priority Data

Mar. 9, 2015 (DE) .......................... 1020151034255

(51) Int. Cl.
*F01N 3/28* (2006.01)
*F01N 3/10* (2006.01)
(Continued)

(52) U.S. Cl.
CPC ........ *F01N 3/2892* (2013.01); *B01F 3/04049* (2013.01); *B01F 5/0473* (2013.01);
(Continued)

(58) Field of Classification Search
CPC ........ F01N 3/0253; F01N 3/0293; F01N 3/10;
F01N 3/206; F01N 3/2066; F01N 3/2892;
(Continued)

(56) References Cited

U.S. PATENT DOCUMENTS 2,965,695 A 12/1960 Sleicher, Jr.
5,044,935 A 9/1991 Peter
(Continued)

FOREIGN PATENT DOCUMENTS

CN 101469627 A 7/2009
CN 101821486 A 9/2010
(Continued)

OTHER PUBLICATIONS

International Preliminary Report on Patentability (in English) for PCT/US2016/014275 dated Jul. 25, 2017. 13 pages.

*Primary Examiner* — Audrey K Bradley
(74) *Attorney, Agent, or Firm* — Harness, Dickey & Pierce, P.L.C.

(57) ABSTRACT

A mixer assembly comprises a tubular housing including a reductant inlet, an exhaust gas inlet and an exhaust gas outlet. The tubular housing defines a longitudinal axis along which exhaust enters the housing. The reductant inlet is positioned on a first side of the tubular housing. An upstream element covers approximately one-half of the cross sectional area of the enhaust gas inlet and is positioned upstream of the reductant inlet. An upstream surface of the upstream mixing element directs exhaust gas flow transversly toward the reductant inlet. A downstream mixing element along with the upstream mixing element at least partially defines a reductant receiving duct in which injected reductant and exhaust gas mix.

8 Claims, 4 Drawing Sheets

(51) Int. Cl.
  *F01N 3/20* (2006.01)
  *F01N 3/02* (2006.01)
  *B01F 3/04* (2006.01)
  *B01F 5/04* (2006.01)
  *B01F 5/06* (2006.01)
  *F01N 3/029* (2006.01)

(52) U.S. Cl.
  CPC .......... *B01F 5/0608* (2013.01); *B01F 5/0644* (2013.01); *F01N 3/10* (2013.01); *F01N 3/2066* (2013.01); *F01N 3/0293* (2013.01); *F01N 3/206* (2013.01); *F01N 2260/04* (2013.01); *F01N 2610/00* (2013.01); *F01N 2610/02* (2013.01)

(58) Field of Classification Search
  CPC ............. F01N 2260/04; F01N 2610/00; F01N 2610/02; F01N 2610/03; B01F 3/04049; B01F 5/0473; B01F 5/0608; B01F 5/0644
  See application file for complete search history.

(56) References Cited

U.S. PATENT DOCUMENTS

| | | | |
|---|---|---|---|
| 5,082,478 A | 1/1992 | Oono et al. | |
| 5,196,655 A | 3/1993 | Woods | |
| 5,425,581 A | 6/1995 | Palm | |
| 5,504,280 A | 4/1996 | Woods | |
| 5,570,576 A | 11/1996 | Ament et al. | |
| 6,449,947 B1 | 9/2002 | Liu et al. | |
| 6,722,124 B2 | 4/2004 | Pawson et al. | |
| 6,767,378 B2 | 7/2004 | Nishiyama et al. | |
| 6,779,786 B2 | 8/2004 | Ruscheweyh et al. | |
| 7,581,387 B2 | 9/2009 | Bui et al. | |
| 7,581,620 B2 | 9/2009 | Woods et al. | |
| 7,814,745 B2 | 10/2010 | Levin et al. | |
| 7,905,322 B2 | 3/2011 | Woods et al. | |
| 8,033,104 B2 | 10/2011 | Zhang | |
| 8,033,714 B2 | 10/2011 | Nishioka et al. | |
| 8,181,671 B2 | 5/2012 | Butler | |
| 8,240,137 B2 | 8/2012 | Liu et al. | |
| 8,371,114 B2 | 2/2013 | Hayashi et al. | |
| 8,539,761 B2 | 9/2013 | Lebas et al. | |
| 8,661,792 B2 | 3/2014 | Greber et al. | |
| 8,695,330 B2 | 4/2014 | Davidson et al. | |
| 8,726,640 B2 | 5/2014 | Tilinski et al. | |
| 9,157,358 B2 | 10/2015 | Beckmann et al. | |
| 9,217,348 B2 | 12/2015 | Kimura | |
| 9,266,075 B2 | 2/2016 | Chapman et al. | |
| 9,410,464 B2 | 8/2016 | Hicks et al. | |
| 9,435,240 B2 | 9/2016 | Sampath et al. | |
| 9,453,444 B2 | 9/2016 | Fischer et al. | |
| 9,506,386 B2 | 11/2016 | Brunel | |
| 9,581,067 B2 | 2/2017 | Guilbaud et al. | |
| 9,587,543 B2 | 3/2017 | Haverkamp et al. | |
| 9,657,620 B2 | 5/2017 | Braun et al. | |
| 9,670,811 B2 | 6/2017 | De Rudder et al. | |
| 9,714,598 B2 | 7/2017 | Alano et al. | |
| 9,719,397 B2 | 8/2017 | Alano et al. | |
| 9,726,064 B2 | 8/2017 | Alano | |
| 9,784,163 B2 | 10/2017 | Noren, IV et al. | |
| 9,786,063 B2 | 10/2017 | Moon et al. | |
| 10,287,948 B1 | 5/2019 | Moulieres et al. | |
| 2002/0162322 A1 | 11/2002 | Ganzmann et al. | |
| 2003/0079467 A1 | 5/2003 | Liu et al. | |
| 2006/0191254 A1 | 8/2006 | Bui et al. | |
| 2007/0036694 A1 | 2/2007 | Nishioka et al. | |
| 2008/0256931 A1 | 10/2008 | Kawakita et al. | |
| 2009/0019843 A1 | 1/2009 | Levin et al. | |
| 2010/0005790 A1 | 1/2010 | Zhang | |
| 2010/0170233 A1 | 7/2010 | Tangemann et al. | |
| 2011/0094206 A1 | 4/2011 | Liu et al. | |
| 2011/0107749 A1 | 5/2011 | Tsujimoto et al. | |
| 2011/0308234 A1 | 12/2011 | De Rudder et al. | |
| 2013/0164183 A1* | 6/2013 | Iijima | B01D 53/90 422/170 |
| 2013/0167516 A1 | 7/2013 | Loman | |
| 2014/0044603 A1 | 2/2014 | Greber | |
| 2014/0325967 A1 | 11/2014 | Kimura | |
| 2014/0334986 A1 | 11/2014 | Stanavich et al. | |
| 2014/0345257 A1 | 11/2014 | Levin et al. | |
| 2015/0071825 A1 | 3/2015 | Sampath | |
| 2015/0110681 A1 | 4/2015 | Ferront et al. | |
| 2015/0354432 A1 | 12/2015 | Gehrlein et al. | |
| 2016/0131007 A1 | 5/2016 | Kauderer et al. | |
| 2016/0215673 A1 | 7/2016 | Noren, IV et al. | |
| 2016/0298517 A1* | 10/2016 | Cossard | F01N 3/2892 |
| 2016/0361694 A1 | 12/2016 | Brandi et al. | |
| 2017/0056846 A1 | 3/2017 | Yu et al. | |
| 2017/0089246 A1 | 3/2017 | Greber et al. | |

FOREIGN PATENT DOCUMENTS

| | | | |
|---|---|---|---|
| CN | 102235211 A | 11/2011 | |
| CN | 104121075 A | 10/2014 | |
| DE | 102010049018 A1 | 4/2012 | |
| DE | 112010002589 T5 | 11/2012 | |
| DE | 102011108237 A1 | 1/2013 | |
| DE | 202013006962 | 8/2013 | |
| DE | 102012224198 A1 | 6/2014 | |
| DE | 102013012909 A1 | 2/2015 | |
| EP | 0555746 B1 | 9/1997 | |
| EP | 1438492 B1 | 7/2007 | |
| EP | 2111916 A1 | 10/2009 | |
| EP | 2111916 B1 | 10/2012 | |
| EP | 2652279 A1 | 10/2013 | |
| EP | 2775114 B1 | 1/2016 | |
| FR | 2943381 A1 | 9/2010 | |
| JP | 3545712 B2 | 7/2004 | |
| JP | 2009030560 A | 2/2009 | |
| JP | 2009150338 A | 7/2009 | |
| JP | 2011032970 A | 2/2011 | |
| JP | 201199415 A | 5/2011 | |
| JP | 2012021505 A | 2/2012 | |
| JP | 5046332 B2 | 10/2012 | |
| JP | 5090890 B2 | 12/2012 | |
| JP | 5348412 B2 | 11/2013 | |
| JP | 5610120 B2 | 10/2014 | |
| WO | WO-2008/074414 A1 | 6/2008 | |
| WO | 2012080585 A1 | 6/2012 | |
| WO | WO-2013104544 A2 | 7/2013 | |
| WO | 2014051617 A1 | 4/2014 | |
| WO | 2016118720 A1 | 7/2016 | |
| WO | WO-2016111701 A1 * | 7/2016 | .......... B01F 3/04049 |

\* cited by examiner

A-A

B-B

C - C

MIXING DEVICE

FIELD OF THE INVENTION

The invention relates to a mixing device for integration or connection or coupling to an exhaust pipe or connection to an exhaust pipe of a combustion engine and for mixing an exhaust gas stream T, which is formed from a housing having a tubular wall with a round or oval profile Q and a mid-axis that can be aligned parallel to the exhaust pipe and from an intermediate wall which is aligned transversely to the mid-axis, wherein the intermediate wall divides the housing and features an inflow side and an outflow side, and creates a division of the housing into an inflow section and an outflow section, wherein at least one inflow opening E1 is provided in the intermediate wall, through which the exhaust gas stream T can flow at least partially from the inflow side of the intermediate wall to an opposite outflow side of the intermediate wall, wherein the at least one inflow opening E1 is positioned eccentrically with respect to the mid-axis and is brought close to a wall section W1 of the tubular wall.

The invention further relates to a mixing device for connection to or integration into an exhaust pipe of a combustion engine and for mixing an exhaust gas flow T, which is formed from a housing with a tubular wall with a round or oval profile Q and with a mid-axis that can be arranged parallel to the exhaust pipe and with a first intermediate wall Z1 and with a second intermediate wall Z2 which are aligned transversely to the mid-axis, wherein both intermediate walls Z1, Z2 at least partly bound a mixing chamber, wherein the first intermediate wall Z1 features at least one inflow opening E1, through which the exhaust gas stream T can enter the mixing chamber, wherein the inflow opening E1 is positioned eccentrically with respect to the mid-axis and is brought close to a wall section W1 of the tubular wall, and the second intermediate wall Z2 features at least one outflow opening A1, through which the exhaust gas stream T can exit from the mixing chamber, wherein the outflow opening A1 is positioned eccentrically with respect to the mid-axis and is brought close to a wall section W2 of the tubular wall.

The exhaust pipe can also be the corresponding part of the housing for a catalytic converter or particle filter.

The mixing relates to an additive to be incorporated, such as a reduction agent or hydrocarbon compounds.

The housing usually has a round profile Q. Alternatively, said housing can also feature an oval or polygonal profile Q.

For the purpose of forming an inflow opening E or an outflow opening A1, a recess is always required within an intermediate wall that closes the profile area QF of the housing. This can be achieved according to the exemplary embodiments through the use of a correspondingly small intermediate wall, which is reduced in diameter over a portion of the circumference.

BACKGROUND OF THE INVENTION

A mixing device for connection to an exhaust pipe of a combustion engine for mixing an exhaust gas stream is already known from WO 2012/080585 A1. This features a housing with a tubular wall with a round profile and a mid-axis that can be aligned parallel to the exhaust pipe, and an intermediate wall with an inflow opening which is essentially aligned transversely to the mid-axis. The intermediate wall has a coiled shape, so that the entire exhaust gas stream is deflected in the same circumferential direction. Additionally, a downstream second intermediate wall is provided with an outflow opening, which together at least partially bound a mixing chamber.

A mixing device is known from U.S. Pat. No. 8,033,104 B2, which features a perforated intermediate wall that lies transverse to the exhaust pipe and a feed channel for reduction agent. A portion of the exhaust gas stream mixes with the reduction agent while flowing through the perforated feed channel. A second portion of the exhaust gas is not guided through the feed channel, but flows through the perforation of the intermediate wall and thus reaches the exit of the mixing device.

In DE 10 2013 012 909 A1, a mixing chamber is described which features a tubular flow guide element, through which the exhaust gas stream is guided from an entrance opening of the mixing chamber to an exit opening, wherein the axis of the flow channel lies transversely to the mid-axis of the mixing chamber. At one end of the flow guide element, an additive can be injected so that said additive mixes with the exhaust gas in the tubular channel.

FR 2 943 381 A1 describes a tubular mixing element with three intermediate walls, wherein the middle intermediate wall is arranged opposite the first and last intermediate wall with respect to the mid-axis.

WO 2014 051617 A1 also describes a mixing device which effects a deflection of the exhaust gas stream in the circumferential direction.

DE 10 2012 224 198 A1 describes a classic swirl mixer consisting of a mixing sheet with several mixing blades distributed over the circumference.

SUMMARY OF THE INVENTION

The object of the invention is to design and arrange a mixing device in such a manner that a good mixing behavior is guaranteed despite the compact, space-saving construction.

The object is attained according to the invention by the fact that a flow guide element S2 is provided with a longitudinal axis L2, which with the intermediate wall at least partly bounds a mixing chamber, and by means of which an at least partial deflection of the exhaust gas stream T can be effected from its original flow direction into a radial direction in relation to the mid-axis or the housing, wherein the flow guide element S2 features at least two outflow openings A1, A2, and by means of the flow guide element S2, the exhaust gas flow T can be guided, starting from the inflow opening E1 to the at least two outflow openings A1, A2, wherein all outflow openings A1, A2 are positioned eccentrically with respect to the mid-axis and are brought close to a wall section W2 of the tubular wall, wherein the wall section W2 is arranged opposite the wall section W1 with respect to the mid-axis, and the outflow openings A1, A2 are arranged on opposite sides of the flow guide element S2 with respect to the longitudinal axis L1, L2, wherein with respect to the mid-axis, a first partial stream T3 can be guided at least partially in the anticlockwise direction and a second partial stream T4 can be guided at least partially in the clockwise direction out of the outflow openings A1, A2. Due to the arrangement of the outflow openings A1, A2 on opposite sides of the flow guide element S2, a bridge is formed.

The object is also attained according to the invention through the fact that the wall section W2 is arranged opposite the wall section W1 with respect to the mid-axis, so that an at least partial deflection of the exhaust gas stream T can be effected at least partially in a radial direction with respect to the mid-axis, and in the flow direction after the first intermediate wall Z1 or before the second intermediate wall Z2 in the area of the outflow opening A1, at least one flow guide element S3 is provided in the mixing chamber, which protrudes in the radial direction over the tubular wall and effects a division of the exhaust gas stream T into two partial streams T3, T4, wherein with respect to the mid-axis, a first partial stream T3 can be guided in the anticlockwise direction, and a second partial stream T4 can be guided in a clockwise direction around the flow guide element S3. During operation, the flow guide element S3 guides the first partial stream T3 in an anticlockwise direction and the second partial stream T4 in a clockwise direction.

The inflow opening E1 lies opposite the respective outflow opening A1, A2 with respect to the mid-axis. In relation to a symmetrical axis, which runs transversely to the mid-axis or at right-angles to a plane LE which spans through the mid-axis and longitudinal axis L2, the inflow opening E1 is positioned between the symmetrical axis Sy and the wall section W1, while the respective outflow opening A1, A2 is positioned between the symmetrical axis Sy and the wall section W2. Due to the opposite arrangement of the inflow and outflow openings E1, A1, A2 with respect to the mid-axis, a deflection of the exhaust gas flow T is achieved in a radial direction to the pipe. This in turn supports the function of the flow guide element S2, S3, which effects the counter-directional deflection in the circumferential direction, i.e. in a clockwise direction and an anticlockwise direction.

It has been shown in studies that the deflection of the entire exhaust gas stream into a single swirl flow moving in the same direction in the circumferential direction leads to a disadvantageous interaction with the housing wall of the mixing device, such as condensation or the crystallization of an additive that has also been transported. Through the use of a flow guide element, which divides the exhaust gas stream and conducts a circumferential movement in the opposite direction, in combination with a flow deflection of the entire exhaust gas stream into a radial direction, the circumferential speed is in general lower, which also leads to lower centrifugal forces. Therefore, the aerosols of the additive transported in the exhaust gas stream are added less intensively to the housing wall, as a result of which the degree of condensation or crystallization is reduced considerably. The deflection in the opposite direction leads to a further mixing of the exhaust gas stream. Here, the flow conditions at the outflow opening A1 are initially of importance for the division of the exhaust gas stream and the respective deflection. A division applied upstream in the area of the inflow opening E1 of the exhaust gas stream and/or its deflection in the circumferential direction can be advantageous, as described below.

In this regard, it can be advantageous when on the intermediate wall a first flow guide element S1 with a longitudinal axis L1 is provided, which protrudes upstream in the axial direction over the intermediate wall and which with the intermediate wall at least partly bounds the mixing chamber, wherein two inflow openings E1, E2 are provided in the intermediate wall, which are arranged opposite in relation to the longitudinal axis L1 or the plane LE, wherein the flow guide element S1 effects a division of the exhaust gas stream T into two partial streams T1, T2, wherein with respect to the mid-axis, a first partial stream T1 can be guided in a clockwise direction and a second partial stream T2 can be guided in an anticlockwise direction around the flow guide element S1 into the respective inflow opening E1, E2 and into the mixing chamber. The exhaust gas stream is therefore already divided when it enters the mixing chamber and is deflected in the circumferential direction, so that mixing is further improved. Due to the arrangement of the inflow openings E1, E2 on opposite sides of the flow guide element S1, a bridge is formed.

For this purpose, it can also be advantageous when the flow guide elements S1, S2 are designed as a single piece and/or when at least one flow guide element S1, S2 is an integrated part of the intermediate wall and/or the tubular wall. The combination of an intermediate wall with a pipe that runs diametrically within it, which forms the flow guide element S1, S2 and bounds the mixing chamber, appears to be advantageous.

It can further be advantageous when the inflow opening E1, E2 and/or the outflow opening A1, A2 extends at least partially or fully onto the flow guide element S1, S2 or is provided in the flow guide element S1, S2.

An inflow opening is required through which the exhaust gas can penetrate. Depending on the design of the mixing chamber, said chamber is arranged within the intermediate wall. Insofar as the flow guide element S1 is an integral part of the intermediate wall, it remains in the intermediate wall near the inflow opening. Only the positioning of the inflow opening can be changed in such a manner that the flow guide element S1 is covered. If the flow guide element S1 is a separate component, which is positioned on the intermediate wall, an inflow opening must be provided both in the intermediate wall and the flow guide element S1. The same applies to the outflow openings.

If the flow guide element S1 is an integral part of the intermediate wall, no further intermediate wall is required for the flow guide element S2, i.e. the flow guide element S2 can be designed as a separate component which is positioned on the one intermediate wall. In an equivalent manner, the flow guide element S2 can also be an integral component of the intermediate wall, so that the flow guide element S1 is designed as a separate component.

Finally, it is also possible to provide two intermediate walls and for the respective flow guide element S1, S2 to be an integral part of the respective first or second intermediate wall.

Here, it can advantageously be provided that the intermediate wall and the mid-axis enclose an angle α between 20° and 80°, or between 30° and 60°, or between 55° and 75°, or of 65°. The angle between the intermediate wall and the mid-axis determines the ratio between the profile size or housing height and the construction length or housing length. Since the shortest possible construction length of the mixing device is desired, angles between 55° and 75° are particularly advantageous. In relation to the intermediate wall, the straight line G should be taken as a reference, which also results from the connection of the two furthest upstream and downstream connection points of the intermediate wall with the tubular wall.

For this purpose, it can be advantageous when the intermediate wall has a single or multiple angles, contoured or curved form, such as an L, a Z or an S form. The intermediate wall can also be designed asymmetrically with respect to the plane LE.

It can additionally be advantageous when in the mixing chamber in the area before the outflow openings A1, A2, for the purpose of avoiding a steam bottleneck, a corrugated base and/or a flow guide element such as a cone or a semi-cone or a ramp is provided.

It can additionally be advantageous when the intermediate wall is at least partially integrated into the housing or is formed at least partially from the housing.

It can additionally be advantageous when a feed device is fitted with a feed nozzle, through which an additive can be brought into the mixing chamber. When the additive has already been mixed into the exhaust gas stream, an improved mixing can be achieved by the mixing device. Naturally, the mixing in is also provided within the mixing device. Here, it is provided that the additive is injected at an angle of between 5° and 185°, and thus e.g. the inner walls of the mixing chamber are used for atomizing and evaporating the additive.

It can also be advantageous when the inflow opening E1 and/or the inflow openings E1, E2 form an inflow profile QE and the housing features a profile surface QF that effects the stream, with 0.08 QF<=QE<=0.42 QF The inflow profile therefore moves between 8% and 42% of the pipe profile or housing profile. This entails sufficient acceleration of the exhaust gas on the one hand and acceptable pressure losses on the other.

Accordingly, it can be advantageous when the outflow opening A1 and/or the outflow openings A1, A2 form an outflow profile QA and the housing features a profile surface QF that affects the stream, with 0.08 QF<=QA<=0.42 QF.

It can additionally be advantageous when the inflow opening E1 or the inflow openings E1, E2 form an inflow profile QE and at least one further inflow opening Ex is provided in the flow guide element S1 or in the intermediate wall Z1, through which a portion of the exhaust gas stream T can enter the mixing chamber, wherein the at least one inflow opening Ex forms an inflow profile Xe, with Xe<=0.1 QE.

It can additionally be advantageous when the outflow opening A1 or the outflow openings A1, A2 form an outflow profile QA and at least one further outflow opening Ax is provided in the flow guide element S2 or in the intermediate wall Z2, through which a portion of the exhaust gas stream T can enter the mixing chamber, wherein the at least one outflow opening Ax forms an outflow profile Xa, with Xa<=0.1 QE.

As a supplement to the inflow and outflow openings E1, E2, A1, A2, further openings Ex, Ax can be provided. While the positioning of the inflow and outflow openings E1, E2, A1, A2 is designed according to the invention in such a way that a deflection of the exhaust gas stream in a radial direction to the pipe is achieved, further openings Ex, Ax can be positioned as required. Preferably, however, openings Ex are arranged in the area of the bridge of the flow guide element S1 so that the entire exhaust gas stream flows into the mixing chamber.

Additionally, outflow openings Ax can be arranged in the area of the bridge of the flow guide element S2. The value Xe is the perforation profile, i.e. the total of the profiles of all inflow openings Ex, and the Xa value is the total of the profiles of all outflow openings Ax. Preferably, 0.03 A<=Xa<=0.07 A or 0.03 E<=Xe<=0.07 E applies.

It can also be advantageous when a stream blade is provided on at least one inflow opening Ex and/or on at least one outflow opening Ax. In order to avoid a stream bottleneck in this area, or for improved alignment of the auxiliary stream guided through the inflow opening Ex and/or the outflow opening Ax, said auxiliary stream can be deflected by the blades in the radial direction and/or in the circumferential direction.

Additionally, it can be advantageous when in the mixing chamber at least one static mixer or a mixer pipe and/or at least one even or angled or curved baffle plate is provided, wherein the baffle plate is largely arranged parallel to the longitudinal axis L1, L2 of the flow guide element S1, S2.

The baffle plate can be fitted with a hydrolysis coating which supports the disintegration or transformation of the additive. An anti-adhesion coating or anti-adhesion surface structure is also provided. Advantageously, the baffle plates are arranged in such a manner that a low level of additional pressure loss is generated. This is achieved by the fact that the plates are arranged almost parallel to the flow direction in the mixing chamber.

BRIEF DESCRIPTION OF THE DRAWINGS

Further advantages and details of the invention are explained in the patent claims and in the description and figures, in which:

FIG. 2a, 2b show the respective profile view A-A or B-B according to FIG. 1a;

FIG. 5b shows the profile view C-C shown in FIG. 5a;

DETAILED DESCRIPTION OF THE INVENTION

Figure 1A:
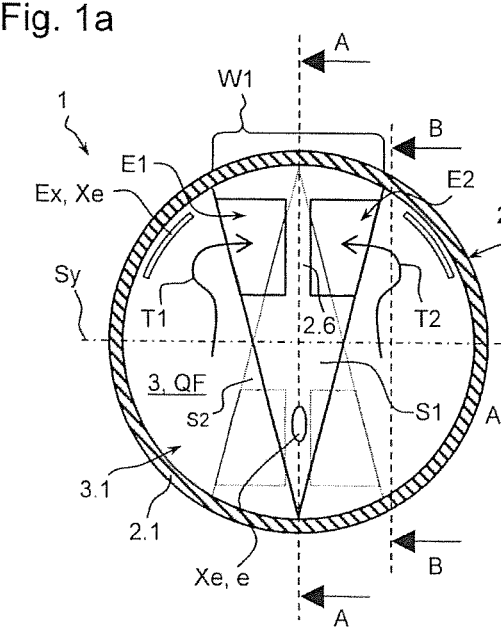
FIG. 1a shows a profile view of the principle sketch of the mixing device from the front.

The mixing device 1 shown in FIG. 1a features a tubular housing 2 with a round profile Q. Within this housing 2, an intermediate wall 3 is provided which is set at an angle α opposite a mid-axis 2.2 (see FIG. 2a, 2b). On the intermediate wall 3, a flow guide element S1 is provided which extends upstream with respect to the direction of the exhaust gas (to the left according to FIG. 2) from the intermediate wall 3. The flow guide element S1 features two inflow openings E1, E2, through which an exhaust gas flow T (see FIG. 3a) can flow from the inflow side 3.1 shown in FIG. 1a of the intermediate wall 3 to the rearward outflow side 3.2. The surface of the flow guide element S1 increases upwards, so that there is sufficient space for the inflow openings E1, E2 mentioned above. A bridge 2.6 is formed between the two inflow openings E1, E2. As a result of the bridge 2.6, said exhaust gas flow T is divided into two partial streams T1, T2. The partial stream T1 flows in a clockwise direction and the partial stream T2 flows in an anticlockwise direction into the respective inflow opening E1, E2. With respect to a symmetrical axis Sy, which according to FIG. 1a divides the housing 2 approximately in the middle and horizontally, the two inflow openings E1, E2 are moved towards the upper wall section W1, additionally the flow guide element S1 features a further inflow opening Ex, through which a small portion of the exhaust gas can flow from the inflow side 3.1 to the outflow side 3.2 of the intermediate wall 3.

Figure 1B:
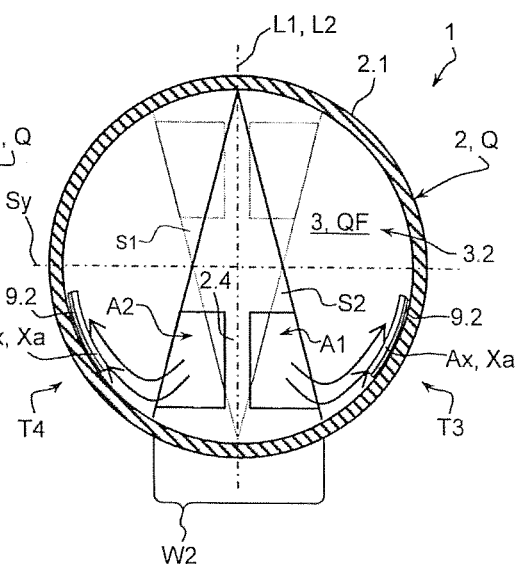
FIG. 1b shows the mixing device shown in FIG. 1a from the rear.

The outflow side 3.2 of the intermediate wall 3 is according to FIG. 1b mirror symmetric to the symmetry axis Sy. There, the flow guide element S2 is located, which extends in the direction of the exhaust gas flow (to the right according to FIG. 2) over the intermediate wall 3. The flow guide element S2 features two outflow openings A1, A2, which are displaced downwards with respect to the symmetry axis S2 to a wall section W2. Both flow guide elements S1, S2 feature a longitudinal axis L1, L2, which according to the exemplary embodiment runs central to the pipe wall 2.1 or at right-angles to a mid-axis 2.2 of the pipe wall 2.1. Further outflow openings Ax are provided in the intermediate wall 3, which are positioned opposite the outflow openings A1, A2 with respect to the symmetry axis Sy. A bridge 2.4 is also formed between the two outflow openings A1, A2, so that the exhaust gas stream T exits in two partial streams T3, T4, wherein the partial stream T3 leaves the flow guide element S2 in an anticlockwise direction and partial stream T4 leaves in a clockwise direction. Additionally, the flow guide element S2 features further outflow openings Ax in the area of the bridge 2.4. A flow blade 9.2 is provided on the respective outflow opening Ax, through which the auxiliary stream that flows through the outflow opening Ax can be deflected in a radial direction.

Both flow guide elements S1, S2 bound a mixing chamber 2.3, which due to the opposite arrangement of the inflow openings E1, E2 on the one hand and the outflow openings A1, A2 on the other is predominantly flowed through by the exhaust gas stream T in the radial direction.

Figure 3A:
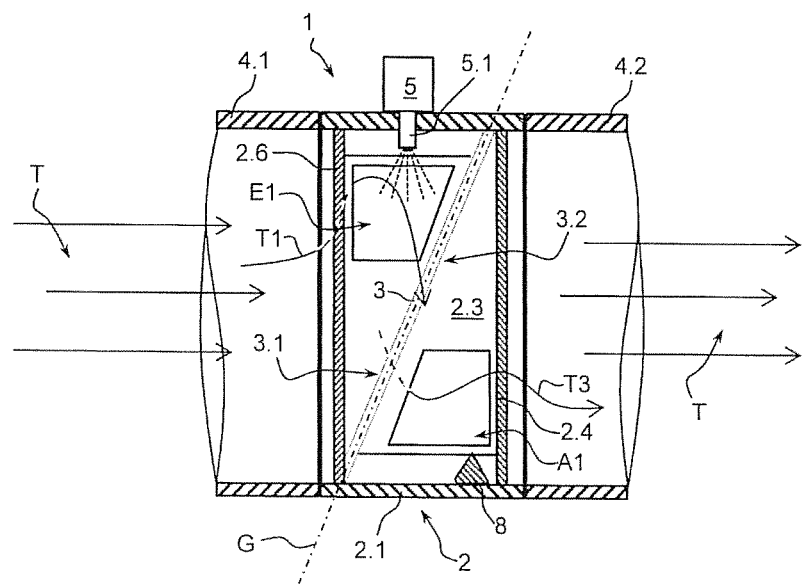
FIG. 3a shows the mixing device with exhaust pipe.

As can be seen in FIG. 3a, a feed device 5 with a feed nozzle 5.1 is located within the mixing chamber 2.3, through which an additive is introduced into the exhaust gas stream T.

Figure 2A:
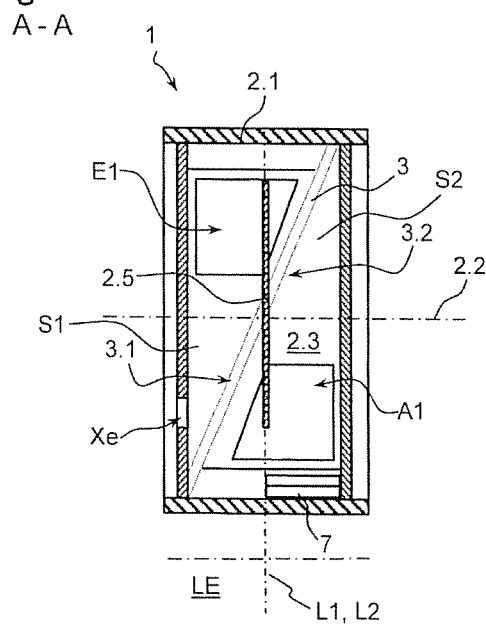

In the profile view A-A shown in FIG. 2a, the flow guide element S1 and the flow guide element S2 can be seen in profile. The exhaust gas that flows in here from the left enters into the inflow opening E1 or into the additional opening Ex into the mixing chamber 2.3 and leaves said chamber via the outflow opening A1. Within the mixing chamber 2.3, a corrugated base 7 is arranged below the outflow opening A1 transversely to the main flow direction, which prevents the formation of a stream bottleneck in the area of the outflow opening A1. Additionally, within the mixing chamber 2.3, a baffle plate 2.5 is provided, which can be moistened with additive through the nozzle 5.1 not shown here.

Figure 2B:
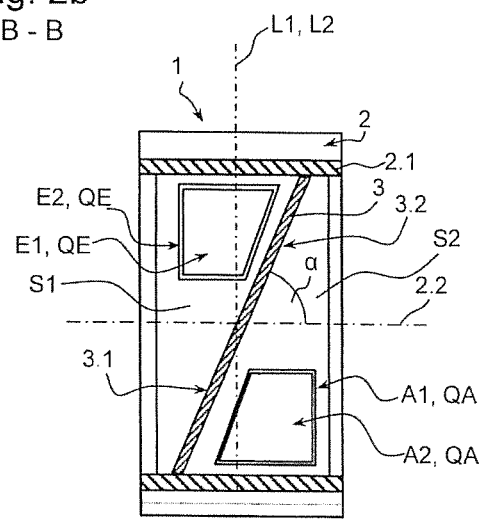

In the profile view B-B according to FIG. 2b, only the intermediate wall 3 is profiled, while the two flow guide elements S1, S2 can be seen in a side view. The opposite inflow openings E1, E2 can be seen, as can the two outflow openings A1, A2. The intermediate wall 3 is set opposite the mid-axis 2.2 and the angle α. The exhaust gas stream that comes from the left here is largely deflected upwards in the radial direction towards the inflow openings E1, E2 and in turn flows through the mixing chamber 2.3 in the radial direction from the inflow openings E1, E2 downwards to the outflow openings A1, A2, and leaves the mixing chamber 2.3 to the right through the two outflow openings A1, A2 according to FIG. 2b.

According to FIG. 3a, the mixing device 1 is an integral part of an exhaust pipe 4.1, 4.2 as part of a particle filter or catalytic converter. Through the nozzle 5.1, additive is introduced into the mixing chamber 2.3, which is guided via the above exhaust gas stream T1 or T2, starting from the area of the inflow openings E1, E2 downwards in the radial direction to the outflow openings A1, A2, and leaves the mixing chamber 2.3 through both partial streams T3, T4, and again combines to form the total stream T. According to FIG. 3a, as an alternative to the corrugated base 7 shown in FIG. 2, a flow guide element in the form of a ramp 8 is provided in the area of the outflow opening A1 within the mixing chamber 2.3, so that stream bottlenecks are prevented in this area.

Decisive for the definition of the angle α is the straight line G, which connects the intersection points of the intermediate wall 3 and the pipe wall 2.1, wherein the two intersection points have the greatest distance from each other with respect to the exhaust gas stream or the direction of the mid-axis 2.2.

Figure 3B:
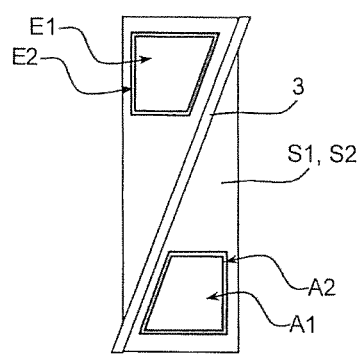
FIG. 3b shows the dividing wall with single-part flow guide element S1, S2.

According to FIG. 3b, the intermediate wall 3 is shown with a single-part flow guide element S1, S2 arranged within it. The single-part flow guide element S1, S2 is designed as a cylindrical pipe, which is inserted into a corresponding recess in the oval intermediate wall 3 and which is tightly connected to the intermediate wall 3. The assembly thus created is then inserted into the housing 2, as shown in FIG. 3a, wherein the intermediate wall 3 is connected on the circumference side with the pipe wall 2.1.

Figure 4:
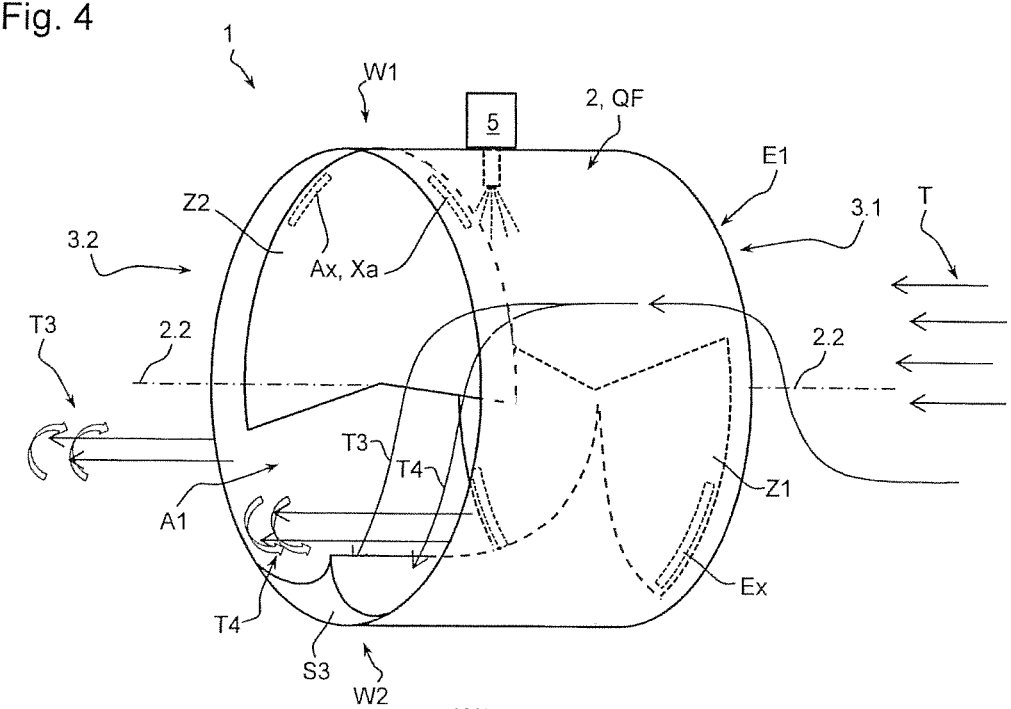
FIG. 4 shows an alternative embodiment in a perspective view.

FIG. 4 shows an alternative embodiment. Within the housing 2, two intermediate walls Z1, Z2 are provided at a distance with respect to the mid-axis 2.2, which extend respectively over approximately half the profile area QF of the housing 2. The two intermediate walls Z1, Z2 are also positioned opposite with respect to the two opposite wall sections W1, W2, so that the exhaust gas stream T, which enters into the mixing chamber 2.3 through an inflow opening E1, is deflected downwards in the radial direction to the outflow opening A1 and leaves the mixing chamber 2.3 through the outflow opening A1. The feed device 5 with the feed nozzle 5.1 for additive is also provided within the mixing chamber 2.3 or in the housing 2.

A wedge-shaped flow guide element S3 is provided in the area of the wall section W2, which divides the impinging exhaust gas stream T into two partial streams T3, T4. Due to the wedge-shaped design of the flow guide element S3, a partial stream T3 is created with respect to the flow direction, which is deflected in an anticlockwise direction, while the partial stream T4 is deflected in a clockwise direction.

Figure 5A:
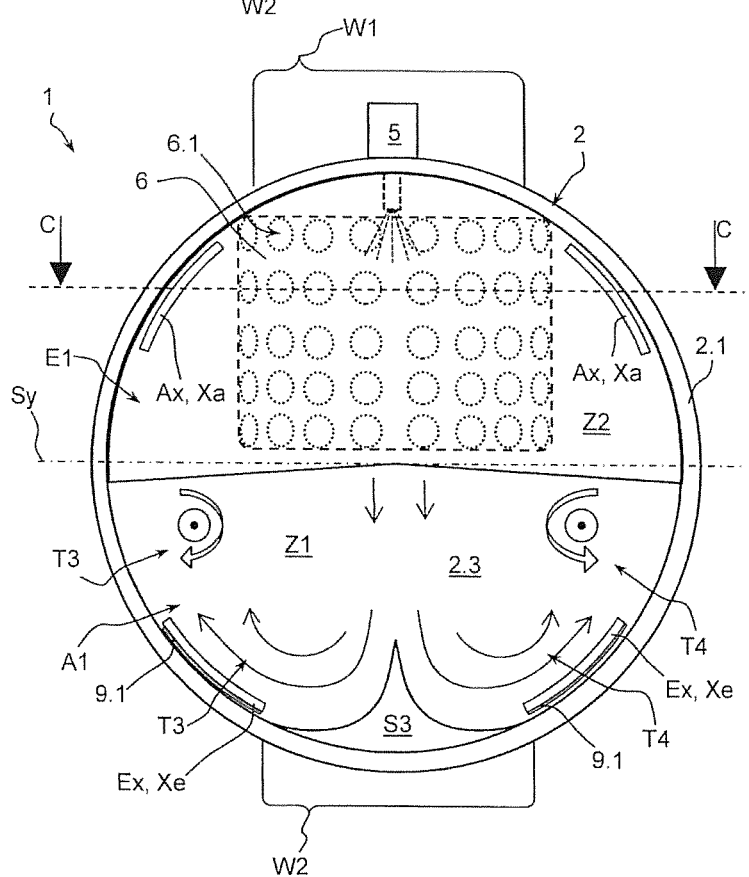
FIG. 5a shows the mixing device shown in FIG. 4 from the rear.

According to FIG. 5a, the mixing device 1 is shown from the outflow side 3.1 (lee side). The mixing chamber 2.3 can only be seen within the scope of the outlet opening A1. In contrast to FIG. 4, within the upper part of the mixing chamber 2.3 an optional mixing pipe 6 with a perforation 6.1 is arranged, which is positioned coaxially to the feed device 5. The exhaust gas or exhaust gas stream T which flows in through the inflow opening, thereby initially flow through the mixing pipe 6 within which it then mixes with the sprayed in additive and is guided downwards towards the flow guide element S3, where the two partial streams T3, T4 are deflected in the circumferential direction in counter directions as described above.

Within the second intermediate wall Z2, further slit-shaped outflow openings Ax are provided, the outflow profile Xa of which is subordinate relative to the outflow opening A1. These then merely serve to prevent a stream bottleneck in the area of the upper wall section W1. Additionally, in the first intermediate wall Z1, further slit-shaped inflow openings Ex are provided, the inflow profile Xe of which is subordinate relative to the inflow profile QE of the inflow opening E1. These serve to prevent a stream bottleneck in front of the first intermediate wall Z1 in the area of the lower wall section W2. A flow blade 9.1 is provided on the respective inflow opening E1, through which the auxiliary stream that flows through the inflow opening Ex can be deflected in a radial direction.

Figure 5B:
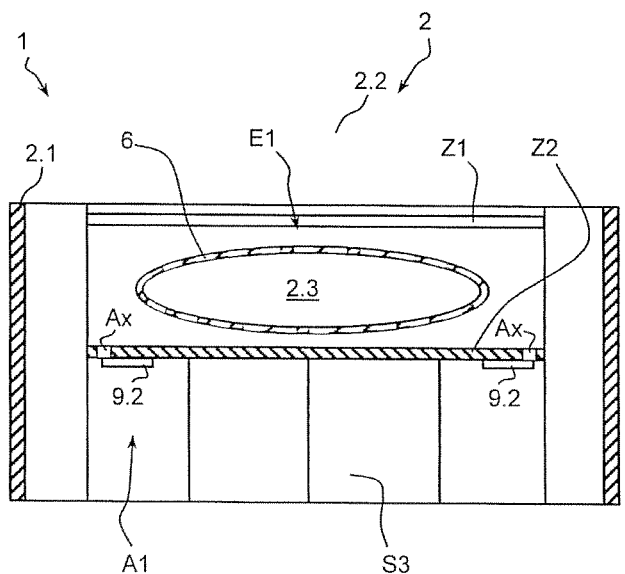

FIG. 5b shows the profile view C-C shown in FIG. 5a. The mixing pipe 6 is oval and therefore features an enlarged entrance and exit area facing towards the exhaust gas stream T. After it has flowed through the mixing pipe 6, the exhaust gas stream T is according to FIG. 5b deflected in the radial direction and leaves the mixing device 1 in a divided, counter-directional stream movement outwards in the circumferential direction.

Figure 6:
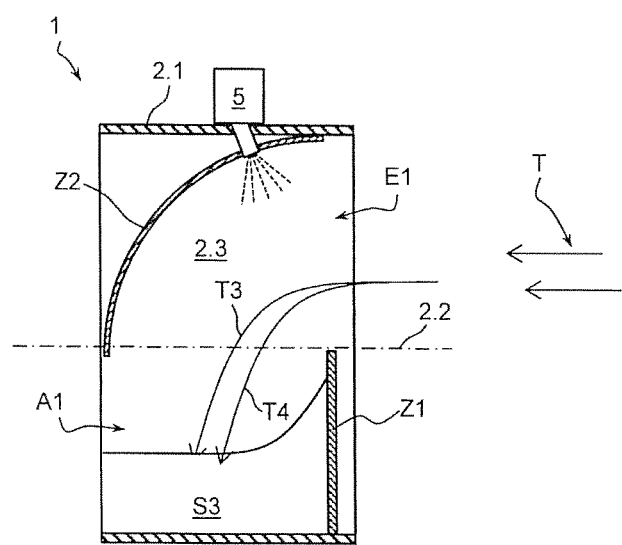
FIG. 6 shows a profile view of a schematic sketch without mixing pipe.

In the exemplary embodiment shown in FIG. 6, the second intermediate wall Z2 is curved. A mixing chamber is not provided. The exhaust gas stream T that enters from the right is deflected downwards in the radial direction towards the flow guide element S3 after entering the mixing chamber 2.3, and leaves the mixing chamber 2.3 through the outflow opening A1. Here, the height of the flow guide element S3 increases in the direction of the first intermediate wall Z1, so that the two partial streams T3, T4 are formed at an early stage.

LIST OF REFERENCE NUMERALS

1 Mixing device
2 Housing
2.1 Tubular wall
2.2 Mid-axis
2.3 Mixing chamber
2.4 Bridge between A1, A2
2.5 Baffle plate
2.6 Bridge between E1, E2
3 Intermediate wall
3.1 Inflow side, windward side
3.2 Off-flow side, lee side
4.1 Exhaust pipe
4.2 Exhaust pipe
5 Feed device
5.1 Feed nozzle
6 Mixer, mixer pipe
6.1 Perforation
7 Corrugated base
8 Cone, ramp, flow guide element
9.1 Blade of Ex
9.2 Blade of Ax
A1 Outflow opening
A2 Outflow opening
Ax Outflow opening
E1 Inflow opening
E2 Inflow opening
Ex Inflow opening
G Connection straight line, straight line
LE Plane
L1 Longitudinal axis of S1
L2 Longitudinal axis of S2
Q Profile of 2
QA Outflow profile
QE Inflow profile
QF Outflow area
S1 Flow guide element
S2 Flow guide element
S3 Flow guide element
Sy Symmetry axis
T Exhaust gas stream
T1 Partial stream of exhaust gas stream
T2 Partial stream of exhaust gas stream
T3 Partial stream of exhaust gas stream
T4 Partial stream of exhaust gas stream
W1 Wall section
W2 Wall section
Xa Outflow profile of total Ax
Xe Inflow profile of total Ex
Z1 Intermediate wall
Z2 Intermediate wall
α Angle

The invention claimed is:

1. A mixer assembly for mixing an injected reductant with an exhaust gas output from a combustion engine, comprising:
   a tubular housing including a reductant inlet, an exhaust gas inlet and an exhaust gas outlet, the tubular housing defining a longitudinal axis along which the exhaust enters the housing, wherein the reductant inlet is positioned on a first side of the tubular housing;
   an upstream mixing element covering substantially one-half of a cross-sectional area of the exhaust gas inlet, wherein the upstream mixing element is positioned upstream from the reductant inlet, wherein an upstream surface of the upstream mixing element directs the exhaust gas flow transversely across the tubular housing toward the reductant inlet; and
   a downstream mixing element positioned downstream from the reductant inlet and the upstream mixing element, wherein the upstream mixing element and the downstream mixing element at least partially define a reductant receiving duct in which the injected reductant and the exhaust gas mix.

2. The mixer assembly of claim 1, wherein the downstream mixing element urges the exhaust gas to flow radially in a direction away from the reductant inlet.

3. The mixer assembly of claim 1, wherein the downstream mixing element covers substantially one-half of a cross-sectional area of the tubular housing.

4. The mixer assembly of claim 1, wherein the reductant receiving duct is shaped to impart a swirling motion on the mixed injected reductant and exhaust gas.

5. The mixer assembly of claim 1, wherein a divider is positioned downstream from the upstream surface of the upstream mixing element to split the exhaust gas into two divided flow streams.

6. The mixer assembly of claim 5, wherein the divider is intersected by an axis along which the reductant is injected.

7. The mixer assembly of claim 5, wherein the two divided flow streams swirl in opposite directions to one another.

8. The mixer assembly of claim 7, wherein the injected reductant impacts the two divided flow streams.

* * * * *